United States Patent [19]
Yamamoto et al.

[11] Patent Number: 5,755,620
[45] Date of Patent: May 26, 1998

[54] GAME SYSTEM AND DATA PROCESSING METHOD THEREOF

[75] Inventors: Sohei Yamamoto; Kenichi Yamamoto; Shinobu Hayashi; Satoshi Shiozaki. all of Tokyo, Japan

[73] Assignee: Kabushiki Kaisha Sega Enterprises. Tokyo, Japan

[21] Appl. No.: 593,333

[22] Filed: Jan. 31, 1996

[30] Foreign Application Priority Data

Apr. 3, 1995 [JP] Japan .................................. 7-078025
Apr. 6, 1995 [JP] Japan .................................. 7-081197

[51] Int. Cl.⁶ .................................................. A63F 9/24
[52] U.S. Cl. ................................................... 463/34
[58] Field of Search ........................... 463/31, 32, 33, 463/34

[56] References Cited

U.S. PATENT DOCUMENTS 4,148,485   4/1979   Rains ............................... 463/31
4,423,870   1/1984   Bristow ............................ 463/31

*Primary Examiner*—George Manuel
*Attorney, Agent, or Firm*—Finnegan, Henderson, Farabow, Garrett & Dunner, L.L.P.

[57] ABSTRACT

There is provided a game system in which a virtual object such as a car is moved in virtual surroundings on a screen of a display. The system comprises an input device for providing from a player operating information concerning an expected motion of the object and an element for simulating the motion of the object in response to the provided information and in consideration of interaction forces between the object and the surroundings. The interaction forces are operated at least two positions of the object. The simulated results of the object Is displayed on the screen of the display.

35 Claims, 15 Drawing Sheets

| | NUMBER OF ASSIGNED ENEMY CAR EACH PROCESSING MODE | | | |
|---|---|---|---|---|
| | MODE0 | MODE1 | MODE2 | MODE3 |
| LARGE / SMALL ↑ INTEGRATED TIME VALUE T OF PROCESSING / RESIDUAL PROCESSING CAPABILITY ↓ SMALL / LARGE | 0 | 0 | 0 | ALL REMAINING CARS |
| | 0 | 0 | 3 | " |
| | 0 | 1 | 3 | " |
| | 1 | 1 | 3 | " |
| | 1 | 1 | 3 | " |
| | 1 | 2 | 1 | " |
| | 2 | 1 | 1 | " |
| | 2 | 1 | 1 | " |
| | 3 | 2 | 2 | " |

A

GAME SYSTEM AND DATA PROCESSING METHOD THEREOF

BACKGROUND OF THE INVENTION

The present invention relates to a game system and a data processing method in the game system, and in particular, to a game system in which a game program such a car race (driving) game is implemented in a manner such that a player can move an object (for example, a car) on a monitor screen.

As computer technology has been advanced, game systems for home use and commercial use are required to provide clearer and more real images. In general, game systems comprises a processing apparatus, operating device, display and sound apparatus. The processing apparatus incorporates a computer unit executing a pre-stored game program. The operating device is used for providing the computer unit operation signals instructing movement of an object of the game. The display is in charge of displaying images produced by the computer unit executing the game program. In addition, the sound apparatus generates corresponding sound to development of the game in cooperation with the computer unit.

Such game systems includes, as one type, a game system handling a car race game or driving game. In the car-related games, It is important to simulate the motion of cars as real as possible.

Typical conventional simulation employs a single point model into which a car is replaced. The center of gravity of a car is used for the single point. Contacting condition between the tires of a car and the ground is determined only through the single point, without estimation in motion of suspensions and other movable members, thus simplifying the simulation. As a result of the simple simulation, motion of pitching, rolling and yawing is totally ignored. Even in a better simulation associated with the conventional art, a car is only drifted on the screen when its steered angle exceeds a fixed angle value, thus representing still monotonous simulated motion.

Although simulation using the single point model is simple in calculation and easy to express the motion of cars that designers wants, the simulated motion unavoidably involves artificiality. Therefore, the game lacks reality and the game system leads to unsatisfaction in the market.

In order to overcome the foregoing difficulties, a complete simulation is conceivable instead of the single point model, since recent OPUs have been remarkably upgraded in processing capability. The complete simulation is based on a situation that, for example, the four tires are individually given forces from the contacted ground, each of the forces has the influence on the car body through each suspension, and such influence decides the motion of a car. It is understood that this makes it possible the real simulation of motion of the car.

However, even when the complete simulation is executed based an the physical laws experienced on actual roads, the car to be simulated is to receive less amounts of information; for example, the lateral acceleration information is not given. This less information is faulty in car game simulation, or unnecessarily too sensitive in the simulated car motion. The car motion is a result influenced by all the combined factors including its moment of inertia, its mass, and its center of gravity. Since physical amounts of information given in the game system are commonly limited, the resultant sensitive motion is difficult to be self-adjusted or moderated. Thus it is understood that the complete simulation requiring a great deal of amounts of physical information cannot be adopted into the conventional car game system. Even if such adoption is enforced, delicate tuning as games, which gives players stable operation, is not provided due to unnecessarily sensitive car behavior.

On the other hand, recent car games require processes for the generation of special effects in car behavior and the determination of collision between the player's car and structures or other cars. The special effects include the generation of a spray of sand. In case of a spray of sand, the conventional art depends a binary determination of generation or non-generation.

The binary determination lacks accuracy, thereby leading to unsatisfied feeling when seeing the screen.

Further, with respect to the above collision determination, it lacks a consideration in that more fittable car models should be used. This lack results in unnatural collision determination and/or lots of calculation for the determination.

In addition, in case of a car race game in which player's car and other cars compete with each other, the computer unit controls the other cars as well as the player's car. The computer unit repeatedly calculates data required for control of both sides of cars with reference to operation information given from players and given by reading a memory into which operation information of the other cars is prestored.

However, since the processes carried out by the CPU of the computer unit is predetermined with no dependence on its current operating state (i.e., calculation load). This manner is frequently resultant in undesired conditions. Largely reduced calculation load causes the CPU to idle deadly. Contrary to it, overflowing calculation load causes troubles in the processing.

Furthermore, some conventional car game systems use polygons to display cars and their background (landform etc.) on a monitor. To be specific, landform data, which are spread over X-Z plane (Y-direction shows its height), are divided beforehand into a plurality of square blocks. Objective blocks being displayed are then specified by a dedicated processor for the display.

However, the above display method of the background has a drawback that excessively requires polygons, because portions of the background which really cannot be seen by players on a curved road fall into the objectives for display. The number of displayable polygons is restricted to a specified maximum. To avoid such drawback, determination should be made block by block such that which of the blocks includes the objective polygons being displayed. This determination also increases the calculation load of the CPU.

SUMMARY OF THE INVENTION

Accordingly, it is a primary object to provide a game in which the behavior of objects is simulated and displayed in more real, stable and easy manner and at the same time, calculation load still remains within moderate amounts.

It is another object that unnecessarily sensitive behavior of objects, such as fluctuations of cars, is preferably suppressed for facilitating and suitably stabilizing operation of the objects.

It is still another object that higher-reality images are provided by enriching the generation of special effects such as a spray of sand and increasing accuracy in collision determination with other objects.

It is still another object that, while the processing capability of the CPU is operated usefully under an approximately constant and limited calculation, the behavior of objects is simulated and displayed in more real.

It is still another object to reduce the calculation load to the CPU by making it possible to effectively use a limited number of polygons and to display the accurate background as distant as possible.

In order to achieve the objects, the present invention has one aspect such that there is provided a game system in which a virtual object is moved in virtual surroundings on a screen of a display, the system comprising: an input device for providing from a player operating information concerning an expected motion of the object; means for simulating the motion of the object in response to the provided information and in consideration of interaction forces between the object and the surroundings, the interaction forces being operated at least two positions of the object; and means for displaying simulated results of the object on the screen of the display.

As another aspect, there is provided a game system comprising a processing apparatus executing a given task at every specified interval, thereby displaying movement of at least two objects including a player's object on a monitor as a game, the game system comprising: means for calculating a current residual processing capability of the processing apparatus in synchronization with the specified intervals; and means for determining a processing mode for the at least one object other than the player's object on the basis of the calculated residual reprocessing capability, the processing mode being used in a next coming interval of the specified intervals; wherein the processing apparatus comprises means for executing a data process of the at least one other object for the next interval accordingly to the determined processing mode.

Further as another aspect, there is provided a method of processing data handled in a game system in which a processing apparatus executes a given task at every specified interval, thereby displaying movement of at least two objects including a player's object on a monitor as a game, the method comprising the steps of: calculating a current residual processing capability of the processing apparatus in synchronization with the specified intervals; means for determining a processing mode for the at least one object other than the player's object on the basis of the calculated residual reprocessing capability, the processing mode being used in a next coming interval of the specified intervals; and means for instructing the processing apparatus to execute a data process of the at least one other object for the next interval accordingly to the determined processing mode.

DETAILED DESCRIPTION OF PREFERRED EMBODIMENTS

A first embodiment of the present invention will now be explained with reference to FIGS. 1 to 17.

Figure 1:
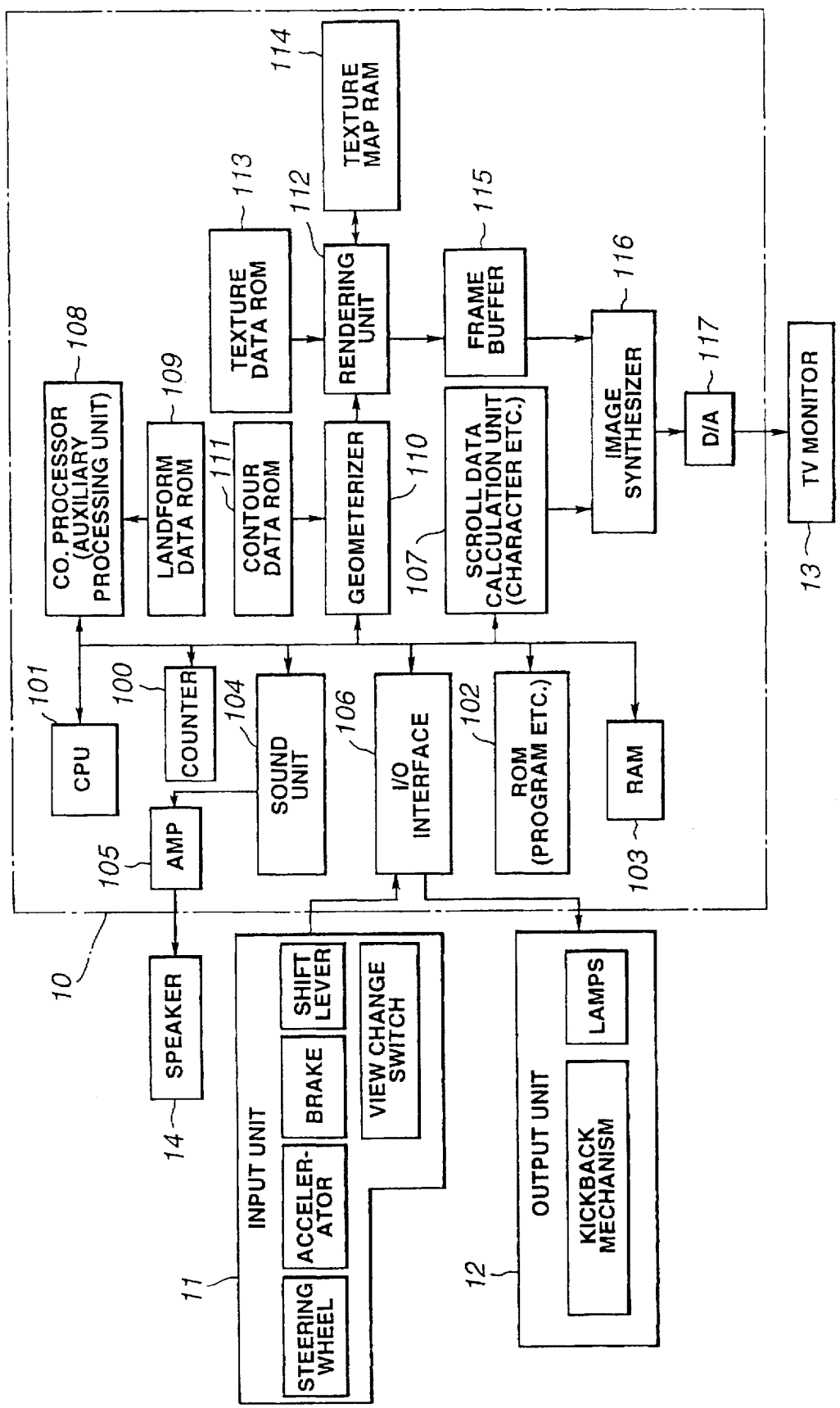
FIG. 1 is a schematic block diagram showing a game system of a first embodiment according to the present invention.

FIG. 1 shows a block diagram of one example of a driving game system to which the present invention is applied. The game system comprises, as basic elements, a game apparatus 10, an input unit 11, an output unit 12, a TV monitor 13, and a speaker 14.

The input unit 11 includes a steering wheel, an accelerator, a brake, a shift lever, a view change switch, and others. The output unit 13 includes a steering wheel kick-back mechanism, various lamps, and others. The TV monitor 13 is used for displaying images of a driving game, but may be replaced with a projector. The view change switch is provided for changing a view point of a player, operating the view change switch permits a player to selectively obtain a view point viewed from a driver's seat or a view point viewing a player's car (object) from the sky, for example.

The game apparatus 10 comprises a counter 100, CPU (central processing unit) 101, ROM 102, RAM 103, sound unit 104, input/output interface 106, scroll data calculation unit 107, co-processor (auxiliary processing unit) 108, landform data ROM 109, geometerizer 110, contour data ROM 111, rendering unit 112, texture data ROM 113, texture map RAM 114, frame buffer 115, image synthesizer 116, and D/A converter 117.

The CPU 101 is coupled with, by way of a bus line, the counter 100, ROM 102 storing information including a specified software program, RAM 103 temporarily storing various data, sound unit 104, input/output interface 106, scroll data calculation unit 107, co-processor 108 and geometerizer 110. The RAM 103 functions as a buffer memory for the geometerizer 110, into which a variety of commands such as display of objects, matrix data in calculating conversion matrixes, etc. are written.

The input/output interface 106 is coupled with both the input unit 11 and output unit 12, which allows not only operating signals of the steering wheel and others of the input unit 11 to be sent in digital form to the CPU 101 but also signals generated by the CPU 101 and others to be sent to the output unit 12. The sound unit 104 is connected to the speaker 14 through the power amplifier 105, a sound signal generated by the sound unit 104 thus being power-amplified and sent to the speaker 14.

In this embodiment, the CPU 101 is designed such that it performs a process including calculation of behavior (i.e., simulation) of cars such as determination of contact between the landform (ground) and cars, estimation of behavior of suspensions attached to four wheels of a car, and determination of collision between cars as well as calculation of a velocity locus for a spray of sand etc, which function as a special effect in the car-related game, based on a specified program stored in the ROM 102, using an operating signal supplied from the input unit 101 and landform data supplied from the landform data ROM 109, or contour data (three-dimensional data of objects including a player's car and enemy cars, backgrounds such as running roads, fields, the sky, audiences, and structures, and others supplied from the contour data ROM 11.

The behavior estimation is to simulate the motion of a car in a virtual space depending on an operating signal of a player given from the input unit 11. In the estimation, coordinate values in a three-dimensional space are calculated, and conversion matrixes for converting the three-dimensional coordinate values into values in the viewing tow-dimensional coordinate system, contour data of cars etc., and landform data are supplied to the geometerizer 110. The co-processor 108 is coupled with landform data ROM 109, thus predetermined landform data being provided to the co-processor 108 (and CPU 101). The co-processor 108 mainly determines contact between the landform (ground) and cars, in addition, the co-processor 108 is in charge of calculation of the floating point in determining the contact and estimating car behavior. Since the contact between the landform and a car is determined by the co-processor 108 and resultant information is sent to the CPU 101, calculation load to the CPU 101 is reduced and the contact determination is fast.

The geometerizer 110 is connected to both the contour data ROM 111 and rendering unit 112. Contour data of polygons are prestored in the contour data ROM 111 and sent to the geometerizer 110. The contour data are three-dimensional vertex data of cars, background etc. The geometerizer 110 converts specified contour data using a perspective conversion matrix given from the CPU 101 thereby providing data converted from the coordinate system in the three-dimensional virtual (world) space to a viewing two-dimensional coordinate system.

The rendering unit 112 applies textures to contour data converted to the viewing coordinate system and send those to the frame buffer 115. In order to perform this application of textures, the rendering unit 112 is connected to not only the texture data ROM 13 and texture map RAM 114 but also the frame buffer 115.

Polygon data is a group of relative or absolute coordinate values for the vertexes of polygons each consisting of three or more vertexes. Mainly, shapes of a triangle or square are used as polygons. The landform data ROM 109 stores relatively rough polygon data which are enough for determining the contact of a car with the landform (ground), while the contour data ROM 111 stores more precisely-designed polygon data representing partial contours of cars, background, etc.

The scroll data calculation unit 107 calculates data concerning scrolling data such as characters. Both the calculation unit 107 and frame buffer 115 are coupled with the TV monitor 13 through the image synthesizer 116 and D/A converter 117. This configuration allows a situation in which image data (i.e., simulation results) of the polygon screen including cars, landform, etc. and being temporarily memorized in the frame buffer 115 and scrolling data consisting of character information such as speed values, lap times, and others are synthesized depending on specified priorities, so that a frame image data is realized. The frame image data are converted to an analog signal by the D/A converter 117 and sent to the TV monitor 13 for real-time display of car-related game images.

The operation of the game system will now be explained in conjunction with FIGS. 2 to 17. FIGS. 2 to 5 show the processing carried out by the CPU 101, in which the behavior information of a car is estimated and scaling values of a spray of sand adopted as the special effect are calculated. The behavior estimation includes the determination of contact between the landform and cars (hereinafter, referred to as "contact determination"), the calculation of behavior information of suspensions for four wheels and the determination of collisions between two cars (hereinafter, referred to as "collision determination").

Figure 2:
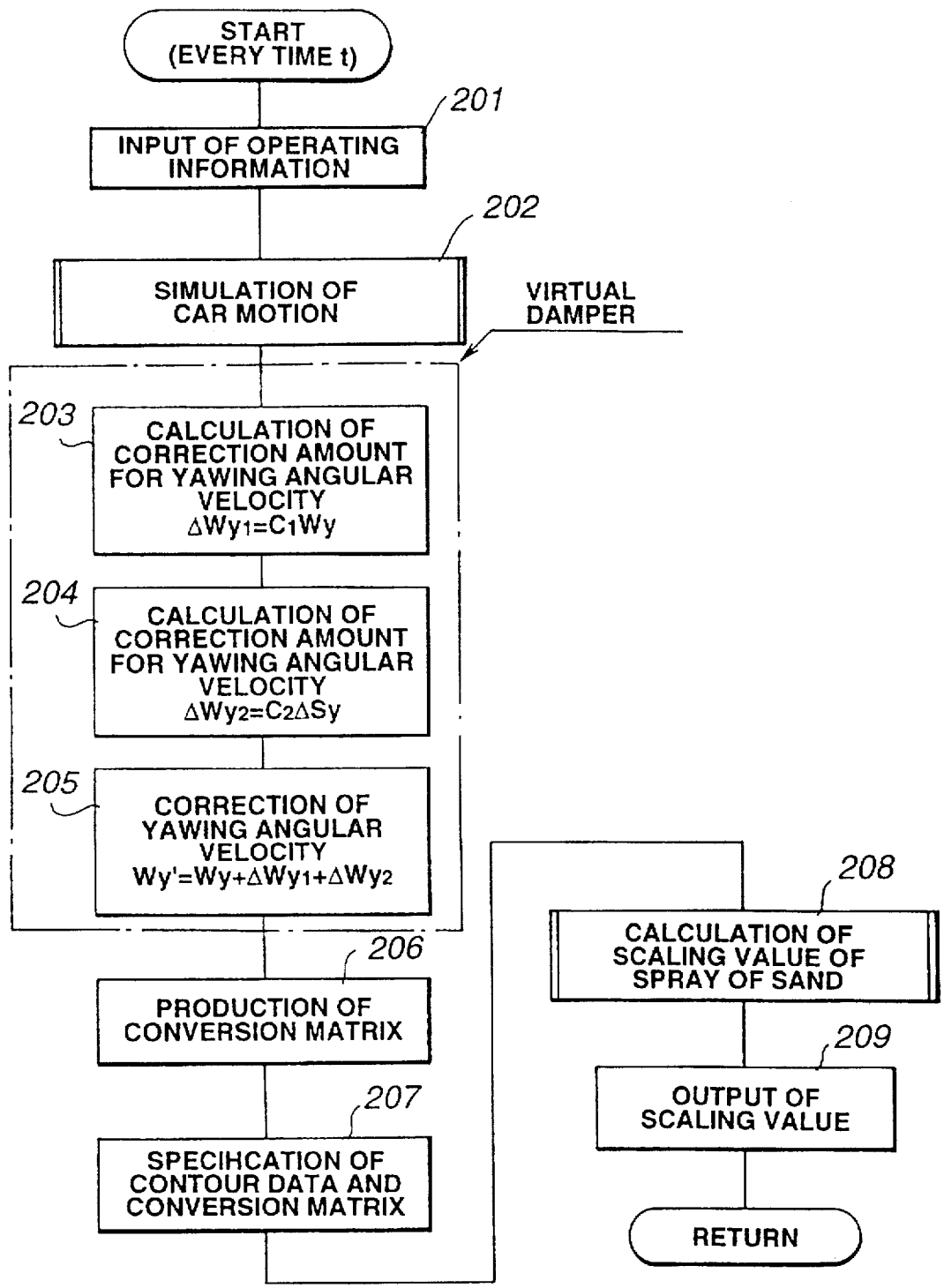
FIG. 2 is a flowchart executed by the CPU in the first embodiment.

When the game system is operated, the CPU 101 starts processing a series of procedures in FIG. 2 under the timer interrupt of every specified interval t. First, the CPU 101 reads in digital operating data relating to the drive of a car, such as a steered angle of the steering wheel and an operated amount of the accelerator, which are generated by a player who operates the input unit 11, through the input/output interface 106 (step 201).

Then at Step 202, the CPU 101 simulates the car motion on the basis of the read-in operating data. In this embodiment, the simulation is more real and provides behavior information close to that obtained by a real car. For such real simulation, the CPU 101 calculates individual forces working on the four wheels (refer to FIG. 3) and uses an elliptical sphere for determining collisions occurred between the two cars (refer to FIG. 4).

Figure 3:
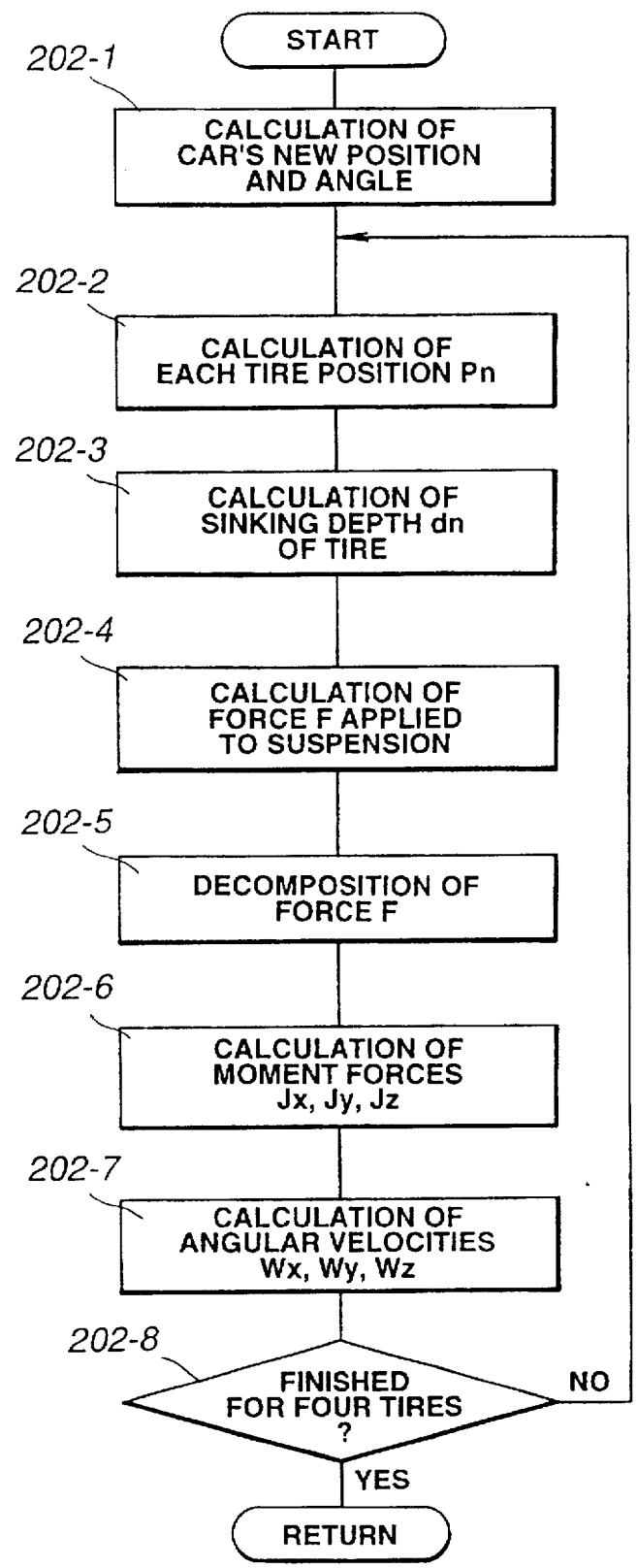
FIG. 3 is a flowchart for estimating car behavior including contact determination of the four wheels and behavior estimation of suspensions.
Figure 6:
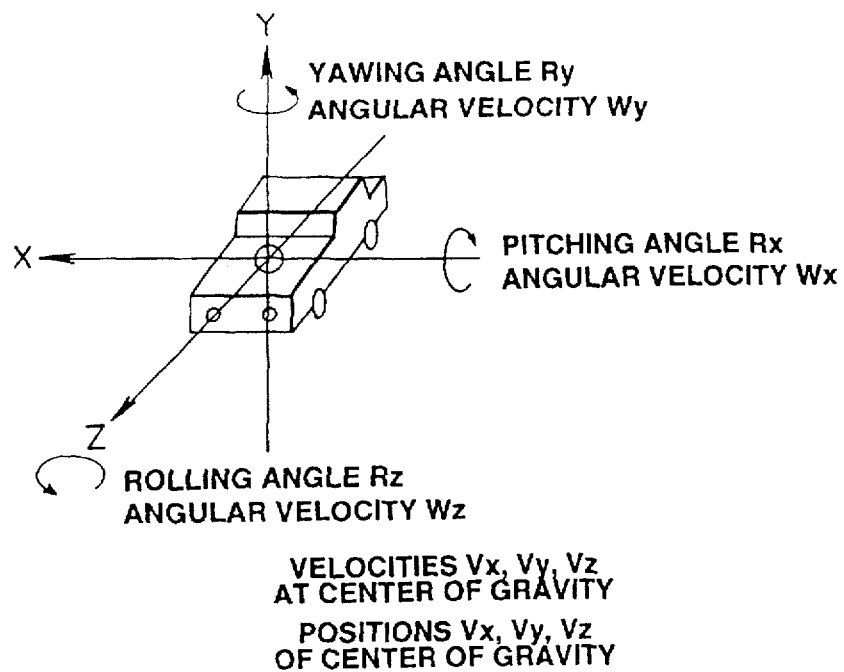
FIG. 6 illustrates motion of a car around specified X-, Y-, and Z-axes.

First, explained is the processing of FIG. 3 where the contact determination, the behavior estimation for the four-wheel suspensions, and the calculation of angular velocities are stated. A three-dimensional world coordinate system is designated as shown in FIG. 6, which consists of X-, Y-, and Z-axes each passing through the center of gravity set in an objective car. A pitching motion is a rotation about the X-axis, a yawing motion is a rotation about the Y-axis, and a rolling motion is a rotation about the Z-axis. The notation is decided such that positional coordinates of the center of gravity is represented by (Px, Py, Pz), and velocities in the X-, Y-, and Z-direction at the position of the center of gravity are represented by Vx, Vy, and Vz. A pitching angle is Rx, a pitching angular velocity Wx, a yawing angle Ry, a yawing angular velocity Wy, a rolling angle Rz, and a rolling angular velocity Wz.

Figure 7:
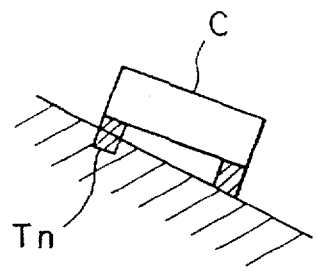
FIG. 7 illustrates imaginary sinking of tires under the ground.

At Step 202-1 in FIG. 3, the CPU 101 calculates an updated position and a new tilting angle of a car C using behavior data including the velocity v, and angular velocities W(Wx, Wy, Wz) which had been acquired in the last (newest) behavior estimation of the car C (see FIG. 7). Then at Step 202-2, positions Pn(n=1 to 4: 4-wheels) of respective tires Tn(n=1 to 4) are obtained, as shown in FIG. 8, by adding the length of each suspension to the updated position and angle of the car C.

Figure 8:
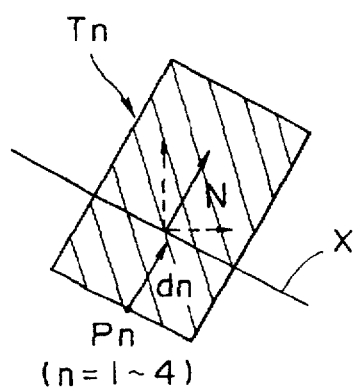
FIG. 8 pictorially shows the sinking depth amount of a tire.

At Step 202-3, as represented in FIG. 8, distances dn (n=1 to 4: 4-wheels) are calculated which express differences in distance between a line X corresponding to the ground and a fixed point on the lower edge Pn of the tire Tn. The distances dn (n=1 to 4) are sinking depths of the tire Tn under the ground. Actually, the tires Tn are pushed back in accordance with the distances dn, thus applying stress to the virtual suspensions depending on the distances dn.

Figure 9:
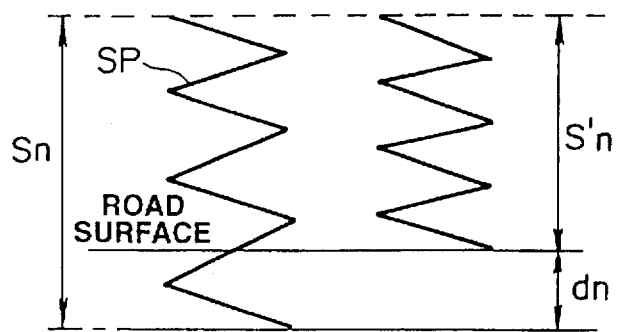
FIG. 9 illustrates an amount of contraction of an suspension of a wheel.

Then at Step 202-4, the force F applied to each virtual suspension virtually attached to each wheel is calculated as follows. Pushing back of the ground to the tire Tn by the distance dn means that each virtual suspension is contracted by dn, as illustrated in FIG. 9, the length of each suspension changing from Sn to Sn'(=Sn−dn). Assuming that the spring constant of each suspension is K, the force F applied to each suspension is expressed the following formula.

$$F = dn \cdot K$$

The spring SP of each suspension attenuates the force F depending on the contracting velocity in a condition that the simple harmonic motion is suppressed. Hence, the force F is obtained by the following formula.

$$F = dn \cdot K - \{(Sn - dn) \cdot C\}$$

At Step 202-5, the CPU 101 decomposes the calculated force F along components in the X-, Y-, and Z-axes to the normal N on the ground. According to the principle of action and reaction, each decomposed component of the force is applied to the tire Tn in each axis direction. At Step 202-6, moment forces Jx, Jy, and Jz around X-, Y-, and Z-axes are computed using data which include the calculated force F applied to the tires Tn. Further, using moments of inertia Ix, Iy, and Iz generated around the axes, updated angular velocities $W_{x+1}$, $W_{y+1}$, $W_{z+1}$ are calculated by the following formulas at Step 202-7.

$$W_{x+1} = W_x + J_x/I_x$$

$$W_{y+1} = W_y + J_y/I_y$$

$$W_{z+1} = W_z + J_z/I_z$$

In addition, using moment forces Jx, Jy, and Jz around the X-, Y-, and Z-axes, other necessary data are calculated for the simulation. At Step 202-8, it is determined if the above processing is ended for all the four wheels; in case that the negative determination (NO) is given, the above-mentioned processing will be repeated in the same way.

Next, the collision determination of cars will be explained in conjunction with FIG. 4. In designing a model of collision determination between a player's car and other cars or structures, etc., a circular sphere model might be adopted into which the contour of cars are imitated. However, such circular sphere model is insufficient for cars of which dimensions in the back and forth direction, lateral direction and height differ from each other. For example, when the diameter of the circular sphere is set to the back-and-forth length of a car, a line required for determining collisions in the lateral direction of the car becomes excessive; both ends of the line are beyond the actual sides of the car. In contrast, when such line is set along the lateral direction of the car in a manner that the length of the line is equal to the width in the lateral direction, a line required for determining collisions in the back-and-forth direction is shorter compared with the actual length. Therefore employing the circular sphere model leads to inaccurate collision determination in most cases.

Figure 10:
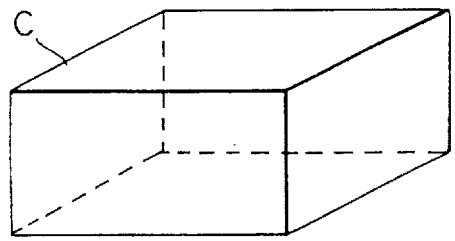
FIG. 10 exemplifies a rectangular parallelopiped into which a car is modeled.
Figure 11:
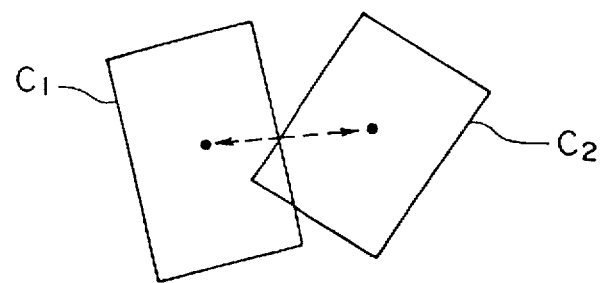
FIG. 11 is an illustration of collision determination between the two rectangular parallelopipeds.

It is conceivable that such drawback can be avoided if a rectangular solid model imitating a car C, as shown in FIG. 10, is employed for the collision determination, for that the dimensions of the rectangular solid easily coincides with those of a car. However, the rectangular solid has different distances from its inner center to each of the edges or each of the corners point by point. In short, the contour (boundaries) of a rectangular solid is defined by a plurality of distance functions which need proper use. This results in complicated calculation, when, as illustrated in FIG. 11, motion of cars involves rotation of collision blocks C1 and C2 (approximate models for collision estimation).

In this embodiment, in order to prevent foregoing various drawbacks raised from the circular sphere and rectangular solid models, the collision blocks are approximated by elliptical spheres $EL_1$ and $EL_2$ (refer to FIG. 12A) each having radiuses equal to the length, width and height of a car. For the elliptical spheres $EL_1$ and $EL_2$, three-dimensional position data on each of their surfaces (boundaries) are given by a single function $F_1$ (or $F_2$) around the center $O_1$ (or $O_2$).

Figure 4:
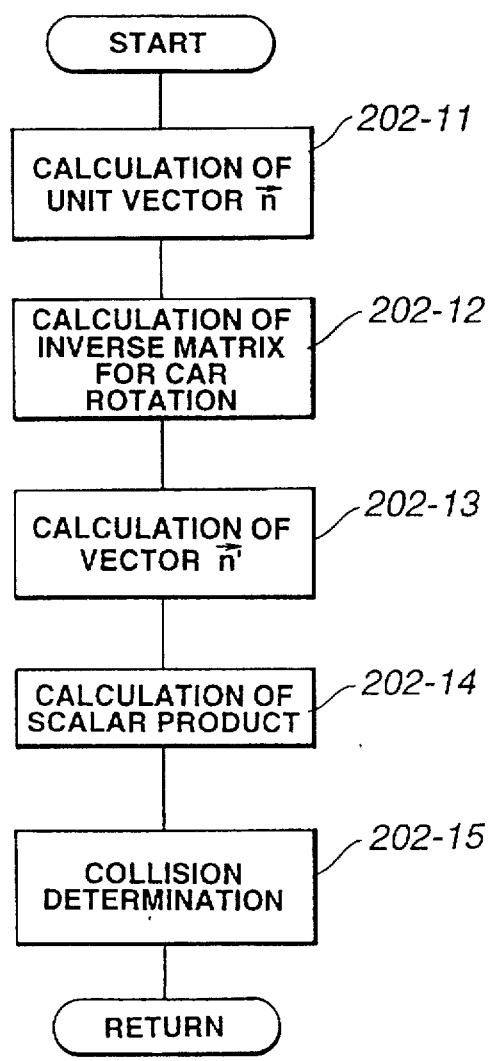
FIG. 4 shows a flowchart for collision determination.

In collision determination, at Step 202-11 in FIG. 4, it is assumed that the contact point (i.e., collision point) between the elliptical spheres $EL_1$ and $EL_2$ resides on a straight line connecting the respective centers $O_1$ and $O_2$. The unit vector n on the straight line is used to calculate the functions $F_1$ and $F_2$. Then at Step 202-12, the inverse matrix of rotation of a car is calculated, and at Step 202-13, the inverse matrix is multiplied by the unit vector to produce a new vector n' (see FIG. 13). The reason why the inverse matrix is calculated is that it returns in calculation the three-dimensional rotation of the elliptical spheres $EL_1$ and $EL_2$ to their initial (reference) position, the rotation depending on the steered angle, running velocity, and others.

Figure 13:
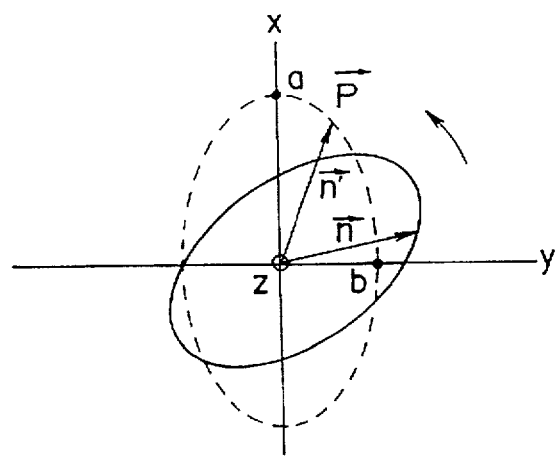
FIG. 13 illustrates rotation of an elliptical sphere required for the collision determination.

At next Stop 202-14, scalar product is carried out between coordinates on the X-, Y- and Z-axes and the vector n' to obtain a vector P extending from the centers $C_1$ and $C_2$ of the cars to the surfaces of elliptical collision spheres, respectively. Since the vector n' is also a unit vector, the actual calculation can be done by multiplying points (a, b, c) residing on the X-, Y-, and Z-axes as well as being defined by the function $F_1$ ($F_2$) by components ($n_x$, $n_y$, $n_z$) of the vector n', component by component. Namely, the formula $$P = (a \cdot n_x, b \cdot n_y, c \cdot n_z)$$

is attained. In FIG. 13, the point C on the Z-axis is not shown. The foregoing processing from Steps 202-1 to 202-14 is performed for each of the elliptical spheres $EL_1$ and $EL_2$ which are objective for collision determination.

At next Step 202-15, a collision state between the two cars is determined by comparing an added value of radiuses $r_1$ and $r_2$ being absolute values of the vectors P of the elliptical spheres $EL_1$ and $EL_2$ with the distance L connecting the centers $O_1$ and $O_2$. In other words, when L>$r_1$+$r_2$ is accomplished, the elliptical spheres $EL_1$ and $EL_2$ are determined that they are not in a collision state. When the condition of $L \leq r_1 + r_2$ is accomplished, the two elliptical spheres $EL_1$ and $EL_2$ are determined that they are in a collision state.

Figure 12A:
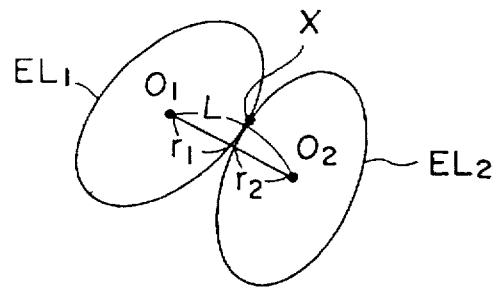
FIG. 12A to 12C are illustrations of collision determination between the two elliptical spheres.

As shown in FIG. 12A, when the elliptical spheres $EL_1$ and $EL_2$ collide with each other at a boundary contact point X which is not on the line connecting both the centers $O_1$ and $O_2$ of both the spheres $EL_1$ and $EL_2$ are determined that they are still not in a collision state, because $L > r_1 + r_2$ is found. The objective two cars further moves from a state illustrated in FIG. 12A to that in FIG. 12B, where a boundary contact point Y common to the spheres $EL_1$ and $EL_2$ is lying on the line connecting both the centers $O_1$ and $O_2$. This state accomplishes a condition of $L = r_1 + r_2$, thus being determined that both the spheres $EL_1$ and $EL_2$ collide with each other. In response to the determination that the two cars have collided with each other, the processing is carried out in a way that the two cars modeled into the two spheres $EL_1$ and $EL_2$ repells to each other or a kickback due to the collision is given to the steering wheel of the player's car, for example.

Figure 12B:
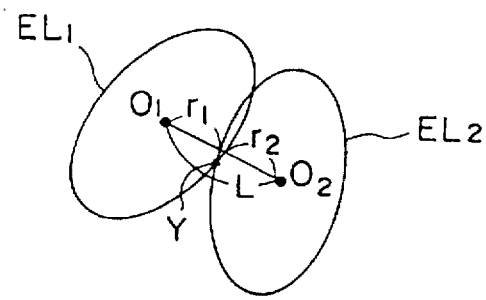
Figure 12C:
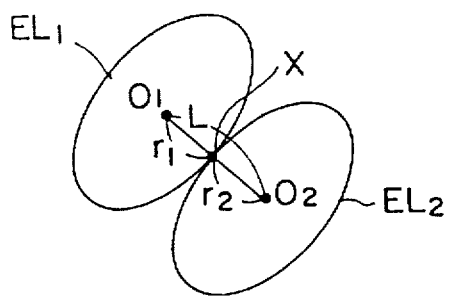

As described above, the collision is not determined for the state of FIG. 12A, but determined for the state of FIG. 12B of which collision is deeper than the one in FIG. 12A. Since the motion of cars are normally quick, there is no or almost no fear that the player feels the collision determination to be delayed. Furthermore, FIG. 12C illustrates a collision example in which the spheres $EL_1$ and $EL_2$ collide with each other via a boundary point X satisfying $L = r_1 + r_2$.

All the parameters X of the car reflecting not only the angular velocity around each of the X-, Y-, and Z-axes, which is based on each wheel, but also the collision determination according to the elliptical sphere estimation are referred to $X_t$, at a time instance t. And the parameters at another next time instant t+1 is expressed by the formula (Step 202 in FIG. 2).

$$X_{t+1} = F(X_t),$$

where F is a function of simulation representing changes in unit time.

Figure 14:
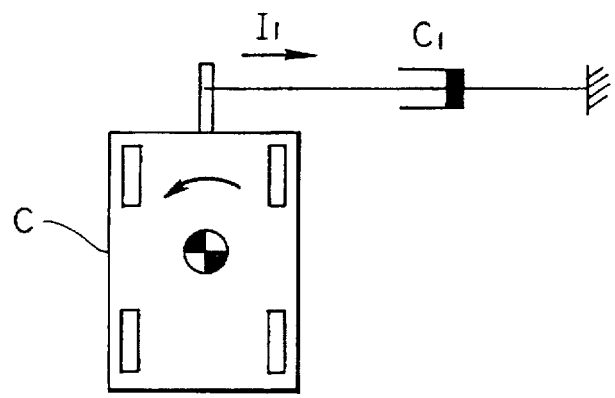
FIG. 14 is a pictorial illustration of a virtual dumper to yawing angular velocity.

Repeating the above steps 201 and 202 and displaying resultant data permits the motion simulation of a car accordingly to the player's operation. However, simulated parameters are too sensitive in the car behavior to make the care driving difficult. To avoid the difficulty, the CPU 101 will then perform the processing of Steps 203 to 205 which constitute virtual dampers (shock absorbers) operated only on calculation. The parameters X resultant from the simulation are corrected using the following manner. The yawing motion of a car is considered to be one of important factors in providing an improved car behavior in the car-related game system. The improved car behavior is close to an actual car behavior on the road (not the game), but the car motion is too sensitive to enjoyably play the game. In this embodiment, the yawing characteristics of cars will be corrected, thus the car behavior in the yawing direction being moderated and the turning characteristics of the car being easily controlled. Step 203 is a correction process for the yawing angular velocity itself. As shown in FIG. 14, there is provided a virtual damper attached to virtual fixed points placed in the lateral direction of the car. The virtual damper generates a repulsion force proportional to the yawing angular velocity $W_y$ and provides the car the reverse-directional moment $I_1$ around the center of gravity of the car. Generating the moment $I_1$ changes the angular momentum, thus the angular velocity changing. When the parameter of attenuating quantities is $C_1$, changing quantities $\Delta W_{y1}$ in the yawing angular velocity is given by $$\Delta W_{y1} = C_1 W_y,$$

Based on this formula, at Step 203, the changing quantities $\Delta W_{y1}$ in the yawing angular velocity is calculated using the attenuating parameter $C_1$ predetermined adequately.

Figure 15:
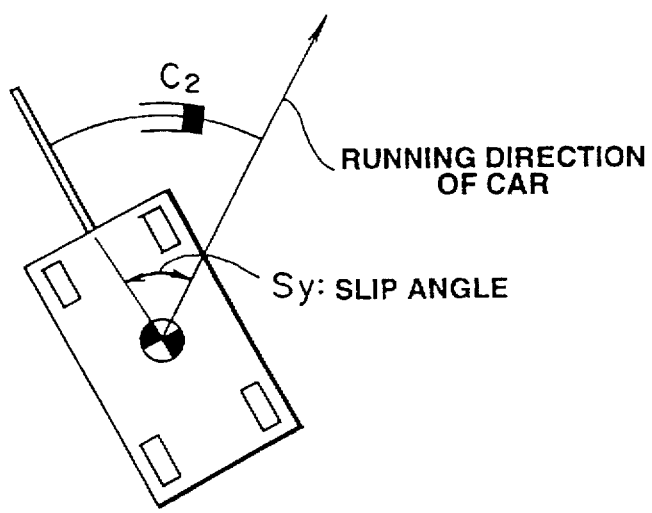
FIG. 15 is a pictorial illustration of a virtual dumper to a slip angle.

Step 204 relates to correction of the yawing angular velocity on the basis of a slip angle. As pictorially illustrated in FIG. 15, a slip angle $S_y$ is given as an angle difference between the running direction of a car and the back-and-forth (longitudinal) direction of the car. The slip angle $S_y$ is calculated using the velocity V at the center of gravity and the yawing angle $R_y$. Another virtual damper is attached, as shown in FIG. 15, so that it is fixed between an virtual point on the running direction of the car and the car itself. This damper also generates a repulsion force proportional to change in time of the slip angle $S_y$, thereby providing changes in the yawing angular velocity. When the attenuating parameter is expressed by $C_2$, changing quantities $\Delta W_{y2}$ in the yawing angular velocity caused by the slip angle $S_y$ is given by $$\Delta W_{y2} = C_2 \Delta S_y.$$

Therefore, at Step 204, using the adequately predetermined attenuation parameter $C_2$, the changing quantities $\Delta W_{y2}$ in the yawing angular velocity is calculated.

The CPU 101 then proceeds to Step 205, where $$W_y' = W_y + \Delta W_{y1} + \Delta W_{y2}$$

is calculated, with the result that the yawing angular velocity $W_y$ which has been used so far is corrected and an updated (corrected) yawing angular velocity $W_y'$ is obtained.

Further, the CPU 101 forms a perspective conversion matrix for perspective converting the three-dimensional contour data into a viewing two-dimensional coordinate system, and notifies the matrix as well as the contour data to the geometerizer 110 by way of the RAM 103 (Steps 206 and 207).

Furthermore, the car-related game system of the embodiment generates sprays of sand as one of special effects in the driving. Scaling values of the sprays of sand are calculated to output them to the geometerizer 110 (Steps 208 and 209). The control of the sprays of sand will be described in conjunction with FIGS. 5, 16 and 17.

Figure 5:
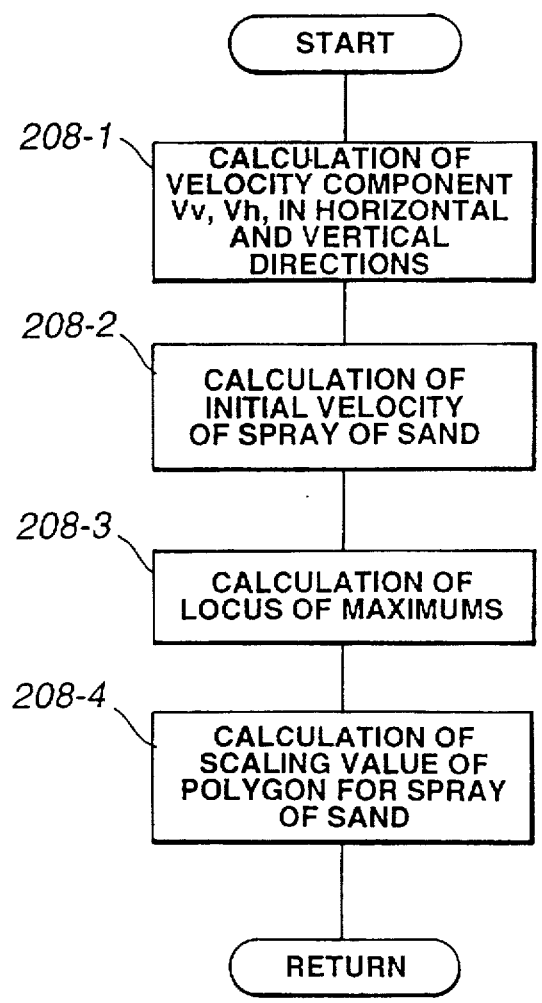
FIG. 5 shows a flowchart for controlling scaling values of a spray of sand.
Figure 16:
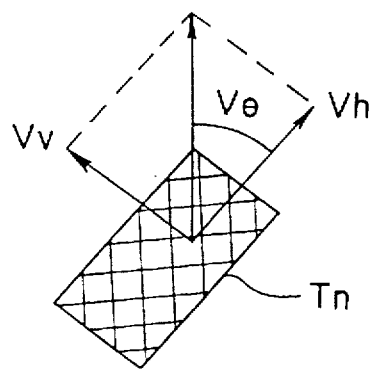
FIG. 16 shows decomposition of a velocity at a tire position, which is needed for calculating scaling values of a spray of sand.

First, it is assumed that the tires $T_n$ splash a tiny sand member (and/or a drop of water). It may be considered that the height (quantity) of the splashed tiny sand member is defined by the velocity of a car and load applied to each of the tires $T_n$. As shown in FIG. 16, the velocity v is decomposed into two components, that is a parallel velocity component $V_n$ and a perpendicular velocity component $v_y$ to the direction of tires $T_n$ (FIG. 5, Step 208-1).

$$v_h = v \cdot \cos \theta$$

$$v_v = v \cdot \sin \theta$$

To simplify the calculation, it is assumed again that the parallel velocity component $V_h$ affects on a first force that splashes the sand member upward and the perpendicular velocity component $V_v$ affects on a second force that splashes it sideward, respectively. When the load applied to the tires $T_n$ is P, it can be supposed that a certain percentage of the load P contributes to the first force and another percentage of the sand member contributes to the second force. The first and second forces are to be expressed by $P_h$ and $P_v$.

The initial velocities $V_{ox}$ and $V_{oy}$ to be given to the sand member are calculated by the formulas:

$$V_{ox}=a \cdot v_v+b \cdot P_v$$

$$V_{oy}=c \cdot v_h+d \cdot P_h$$

where a, b, c and d are constants. The CPU 101 carries out those formulas to obtain the initial velocity $V_0$ (Step 208-2).

Figure 17:
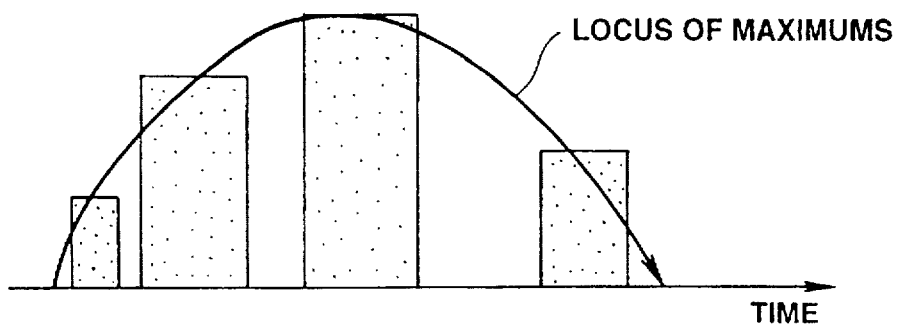
FIG. 17 exemplifies a locus curve representing a relation between time and maximums of scaling values of a spray of sand.

After the initial velocity $V_0$ is calculated, using the acceleration of gravity g, a motion locus of maximum velocities is calculated at Step 208-3 which represents changes in time of splashed sand members. FIG. 17 shows such one example. The initial velocity may be modified by offset values randomly predetermined to some extent.

For displaying a block of sprays of sand (or sprays of water) based on the calculated motion locus, it can be assumed that the block of sprays of sand behaves in the same way at every spray and each of the sprays takes the maximums on the motion locus. Thus, the maximums are obtained as scaling values for sprays of sand for elapsing time t (Step 208-4).

The calculated scaling values are then sent to the geometerizer 110 via the RAM 103 at the process of Step 209 in FIG. 2. The geometerizer 110 applies the scaling values to a single flat polygon in such a way that the heights of the polygons are multiplied by the scaling values so as to expand/contract the heights and map on from a texture illustrating a block of sprays of sand. Steps 208 and 209 are processed only when the CPU 101 estimates motion quantities of cars, and judges that the generation of sprays of sand is necessary.

In this embodiment, as described so far, the contract between a car and the ground is determined for all the four wheels. Forces applied to the four wheel tires are then calculated depending on the contract conditions and the expansion/contraction of the virtual suspensions of the four wheels is calculated. A simulation is possible in which at least various quantities (moment forces, angular velocities, etc.) concerning pitching, yawing and rolling motions. Hence, there are differences between the embodiment and the prior art employing a model into which a car modeled as one mass point. A player's operation for the steering wheel and accelerator is more precisely reflected on car's behavior of rolling, pitching and yawing. Therefore, more higher reality of operation is realized. The calculated quantities of behavior is also used for displaying changes in the tire positions in the image according to a rolling condition, for example, which can also provide more real images.

On one hand, when virtual objects (e.g. cars) are moved on calculation in a condition of less actual physical information, only a higher-accuracy simulation results in too sensitive in car behavior.

To avoid excessive sensitivity, the car of the embodiment is provided with the virtual dampers in association with both the yawing angular velocity and slip angle, thus adequately suppressing (correcting) yawing which affects largely the motion of cars. The virtual dampers are realized by calculation only and easily practiced by giving adequate attenuation parameters in the program carried out by the CPU 101. Adopting the dampers retains both real and precise behavior of cars and excessive, but exclude sensitive turning characteristics in the yawing direction. As a result, stable and pleasant maneuverability (operation feeling) can be given to players. On the other hand, high quality of car-racing game systems can be provided in which game feeling is well adjusted by designers of the game.

In the above simulation, the elliptical sphere is used as a car model for determining collision with other cars. The elliptical sphere is designed to have the length and radius appropriately resembling a three-dimensional car and causes to be rotated according to car's rolling, pitching and yawing motions during the simulation. Compared with the circular sphere model, the elliptical sphere makes collision determination more accurate, thereby simulating more real car behavior. Additionally, compared with the rectangular parallelopiped model, the elliptical sphere avoids the calculation for collision determination from becoming larger, maintaining a moderate level of calculation load.

The results of the foregoing highly accurate simulation are used in common for controlling largeness of sprays of sand (water) employed as a special effect involved in car behavior, thus preventing calculation amounts from increasing largely. Largeness of sprays of sand (i.e., largeness of polygons rendering sprays of sand) is adjusted accordingly to calculated load applied to tires and to car velocities. This makes it possible to display more real and impressive images reflecting the attributes on roads.

Although the virtual damper is arranged for both the yawing angular velocity and the slip angle in the above embodiment, it is also possible to employ the virtual damper for either of those physical quantities.

Further, various parameters of the special effects according to the invention can be used in addition to the described ones; for example, sound generated from the speaker and/or kickback quantities fed back to the steering wheel kickback mechanism can be employed as the parameters and controlled.

A second embodiment of the present invention will now be described in conjunction with FIGS. 8 to 24.

The hardware components of a car-related game system of the second embodiment is configured in the same as those in the first embodiment.

Figure 18:
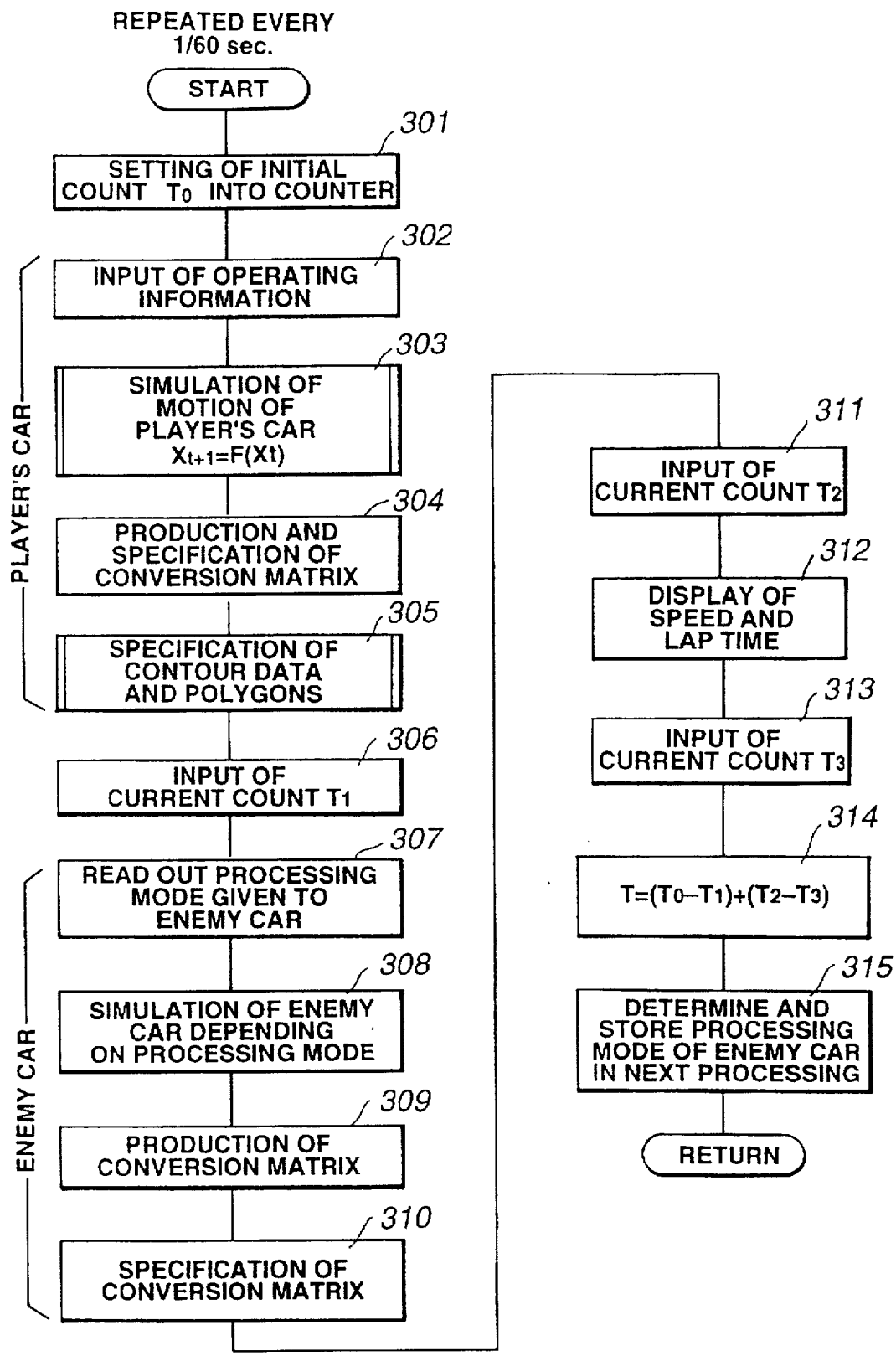
FIG. 18 is a flowchart executed by the CPU in a second embodiment of the present invention.
Figure 19:
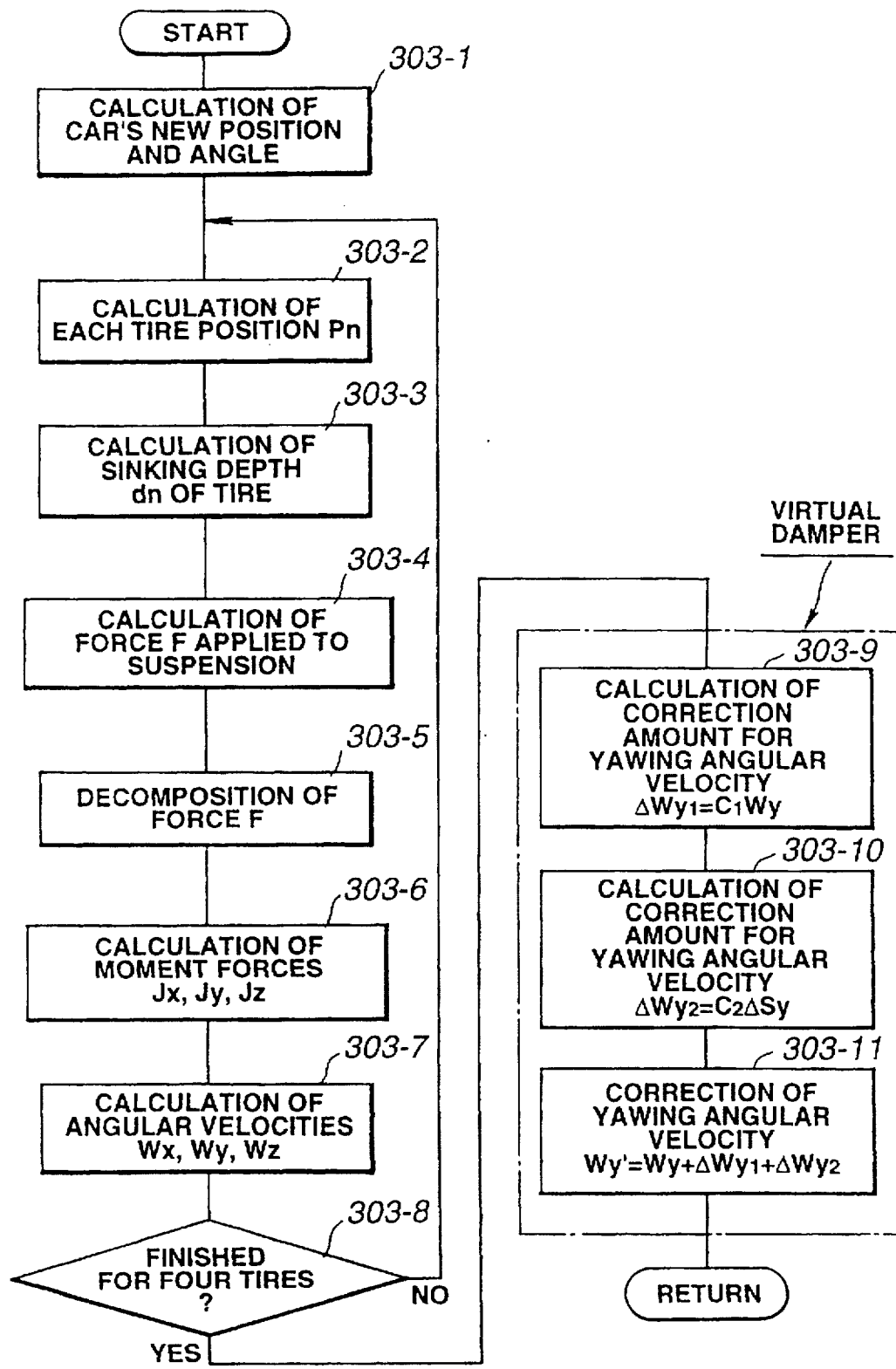
FIG. 19 is a flowchart for estimating car behavior including contact determination of the four wheels and behavior estimation of suspensions.

When the game system is activated, the CPU 101 begins to process a series of steps shown in FIG. 18 through a timer interrupt of every certain interval t (to be specific, it is 1/60 sec. corresponding to the refreshment of the monitor screen). The interval of "1/60 sec." is allocated to one processing loop in the CPU 101.

First, the count of the counter 100 is read in as the initial value $T_0$ (Step 301). Then operating information such as steered angles of the steering wheel and accelerated values of the accelerator, which are all produced in response to player's operation, are read in digital quantities via the input/output interface 106 (Step 302).

At Step 303, based on the operating information, the simulation of the player's car is carried out, in which the forces applied to the four wheels are calculated, respectively. Hence the simulation becomes more real. To be specific, the simulation is performed through a series of steps 303-1 to 303-11 in FIG. 19. Steps 303-1 to 303-8 are the same or similar to Steps 202-1 to 202-8 already described in FIG. 3. Further Steps 303-9 to 303-11 are the same or similar in processing to Steps 203 to 205 already described in FIG. 2.

All the parameters X of the car reflecting not only the angular velocity around each of the X-, Y-, and Z-axes, which is based on each wheel, but also the collision determination according to the elliptical sphere estimation are referred to $X_t$ at a time instance t. And the parameters at another next time instant t+1 is expressed by the formula (Step 303).

$$X_{t+1}=F(X_t),$$

where F is a function of simulation representing changes in unit time.

Further, the CPU 101 forms a perspective conversion matrix for perspective converting the three-dimensional contour data into a viewing two-dimensional coordinate system, and notifies the matrix as well as the contour data to the geometerizer 110 by way of the RAM 103 (Stop 304).

Figure 20:
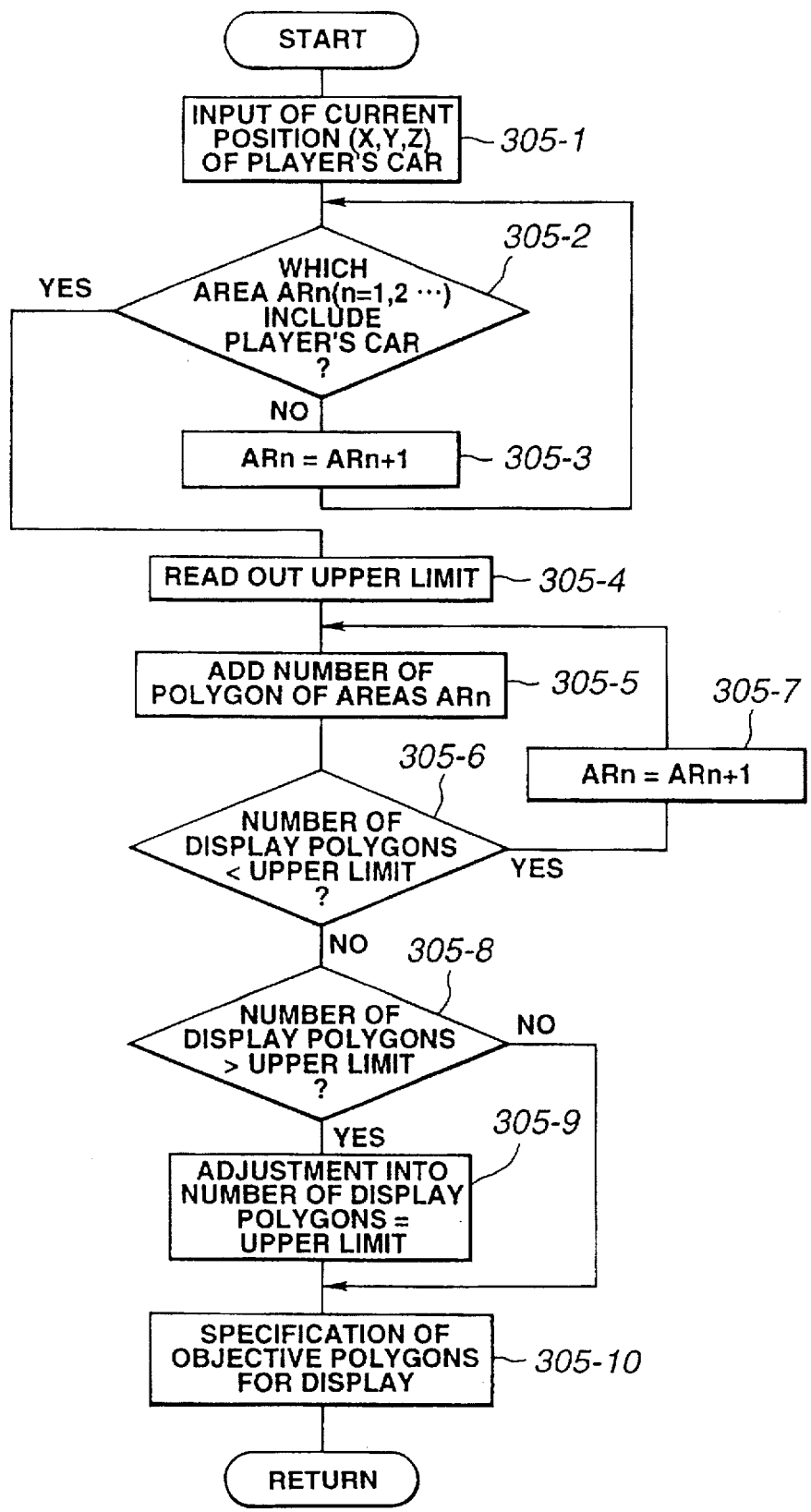
FIG. 20 is a flowchart for displaying polygons of areas divided along a running road.
Figure 21:
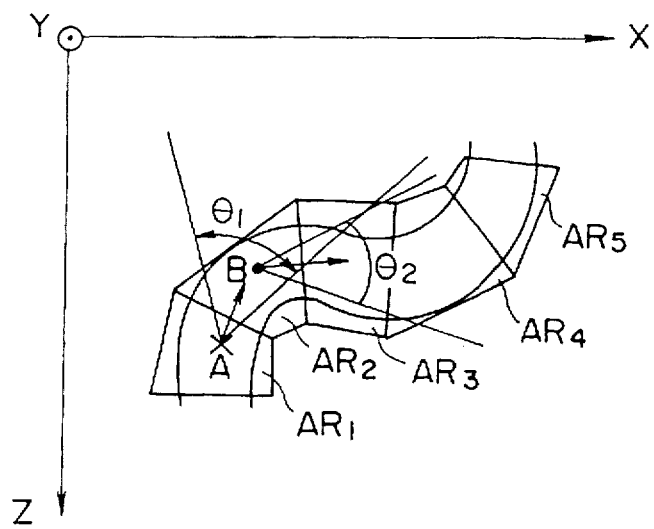
FIG. 21 illustrates an area division monitor for displaying the polygons in the second embodiment.

Then at Step 305, polygons (contour data) for a running road and a background divided into areas along the running road are specified and controlled. Specifically, as shown in FIG. 20, the current position of player's car is taken in (Step 305-1 in FIG. 20). For a plurality of areas ARn (n=1, 2, ...) formed by division along the running road on X-Z plane as illustrated in FIG. 21, it is determined if the player's car belongs to a specified one of the areas ARn (Stop 305-2). When the determination is NO, the specified area is incremented by ARn=ARn+1 (Step 305-3). In contrast, the determination of YES at Step 305-2 permits the CPU 101 to proceed to the next processing of Step 305-4, where the maximum of number of polygons to be objected (hereinafter referred to as "display number of polygons"), which is predetermined, are read from a memory (ROM 102 or RAM 103). The maximum can be altered according to parameters such as positions on the running road.

Then, the number of polygons in the background for a determined area ARn within which the player's car is currently positioned is added to the display number of polygons (Step 305-5). Then it is determined if "the added display number of polygons is smaller than "the maximum" (Step 305-6). This makes it possible the addition of polygons which uses as the starting point a determined area ARn within which the player's car currently exists. When YES is determined at Step 305-6, there is left a margin for an upper limit (maximum) of the display number of polygons. Accordingly, an increment of ARn=ARn+1 is carried out to go to further areas ARn (Step 305-7). And the foregoing Steps 305-5 and 305-6 are repeated for adding up the number of polygons and comparing it with the upper limitation.

However, the determination is NO at Step 305-6, another determination is introduced at Step 305-8 that it is if "the display number of polygons" is more than the upper limit. The determination YES at that Step means that the display number of polygons has already exceeds the allowed upper limit. Thus, excessive partial polygons exceeding the limit of an objective area ARn. In such a case, in order to accomplish an equilibrium of "the display number of polygons"="the upper limit", loaded into the display polygons are only partial polygons of an objective area ARn producing such excess (Step 305-9).

This partial loading of polygons is carried out from the first-positioned polygon of the objective area ARn until the display number of polygons reaches the upper limit. After completion of the loading, the polygons (contour data) of one or more areas ARn whose total number of the polygons is adjusted into the equilibrium in which the display number of polygons "equal to" the upper limit are specified into the geometerizer 110 (Step 305-10). In contrast, when the determination is NO at step 305-8, the number of polygons has already been in the equilibrium. Hence the process of Step 305-9 is skipped and the process of Step 305-10 begins. After Step 305-10 has been finished, the processing will return to FIG. 18. In addition, the processes of Steps 304 and 305 are performed every interrupt, and even when the view change switch is operated, it is done by the same way.

After completion of the processing for the player's car, the CPU 101 reads and memorizes the current count $T_1$ of the counter 100 which is counting down (Step 306). The processing is moved onto Steps 307 to 310 where enemy cars are then processed. The "enemy cars" are cars shown on the TV monitor 13 by the CPU 101, which are given operation data (such as velocities and steered angles) accordingly to the game progress by the implemented program for their behavior simulation.

First, a processing mode of enemy cars is read out from the memory 103, the processing mode being determined by the last loop process. In the present embodiment, there are provided the following four modes as the processing mode.

Mode 0: this mode is assigned to the most complicated (i.e., highest in accuracy) processing for the enemy cars. The behavior estimation of suspensions is carried out for the four wheels in the same manner as the one in the player's car (the same processing as in FIG. 3 is carried out), so that displayed are the rolling motion of the enemy car bodies caused by lateral angular acceleration, the drifting motion of the enemy cars caused by yawing angular velocity, and others when the enemy cars turn curves in a virtual road.

Mode 1: in this mode, the behavior estimation of suspensions is carried out for only the center of gravity of each enemy car. No calculation is performed for angular velocities. And the enemy cars are always oriented along the running direction on a virtual road.

Mode 2: in this mode, the behavior estimation of suspensions is not carried out and the enemy cars run along a predetermined position (the center of the road).

Mode 3: the enemy cars only run at a constant speed, but they are not shown on the monitor (namely, the enemy cars run far away, so they cannot be seen).

To be specific, at Step 307, any processing modes assigned to individual one or more enemy cars are read every interval t. The mode-assigning processing will be described later.

At Step 308, one or more enemy cars are simulated in compliance with the read processing modes. Then for the enemy cars, in the same way as the player's car, perspective conversion matrixes for converting each of the three-dimensional contour data into data in the viewing coordinate are formed, and the matrixes are sent to the geometerizer 110 via the RAM 103 (Steps 309 and 310). After such a series of processes for the enemy cars are finished, the processing is moved to Step 311, where the current count $T_2$ of the counter 100 is read in.

Then, the processing is moved to Step 312, where an instruction is initiated to the scroll data calculation unit 107 for displaying character data including readings of the speed meter, rotations of the engine, and lap time values in the race.

Figure 22:
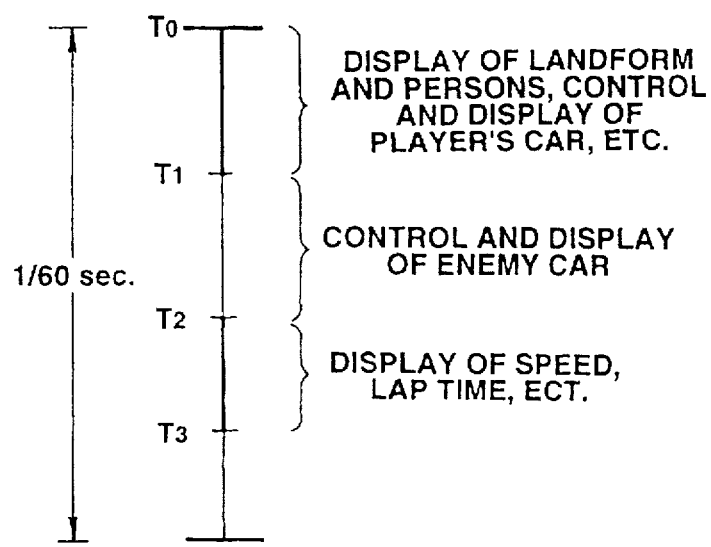
FIG. 22 illustrates a concept of a flow of processing time in one processing loop realized by one interrupt.

The CPU 101 then processes Step 313 in FIG. 18, at which the current counting-down value $T_3$ is read from the counter 100. Then at Step 314, the four counting values $T_0$ to $T_3$ stored so far are used to calculate $$T=(T_0-T_1)+(T_2-T_3),$$

providing an integrated time value T. The time value T means, as shown in FIG. 22, an integrated interval used to process the task other than the processes of the enemy cars in the display period of 1/60 sec. of the one frame. The integrated interval includes the display of a landform, persons, and the like, control and display of behavior of the player's car, and process and display of the scrolling screen, etc. The larger the integrated time value T, the larger a calculation load (except calculation for the enemy cars) given to the CPU 101, thus showing a less residual capability of processing tasks left in the CPU 101. When the integrated time value T is small, the calculation load is also small and in contrast, the residual processing capability is large.

Figures 23, 24:
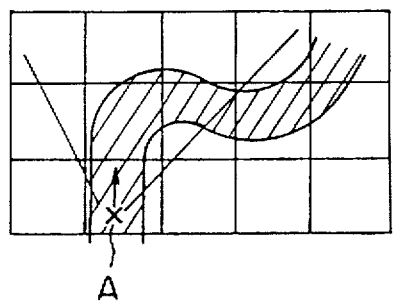
FIG. 23 is one example of a relation between processing load and the assigning number of enemy cars for every processing mode.
FIG. 24 shows a conventional block division technique for displaying polygons.

The CPU 101 then proceeds to Step 315, where it determines processing modes for the enemy cars and stores them in the memory. The processing modes of this time, which will be read at Step 307 in the next loop processing, are determined depending on largeness of the current residual processing capability (i.e., largeness of the integrated time value T). In this embodiment, the integrated time value T is divided into nine stages, as shown in FIG. 23. The modes 0 to 3 are assigned in turn to the enemy cars in proportion to the distance between each enemy car and the player's car. The highest mode "0" is assigned to specified several enemy cars fairly closed to the player's car. In this case, as the integrated time value T becomes large (i.e., as the residual processing capability of the CPU 101 becomes small), the modes requiring higher-accuracy processing are gradually excluded. As the residual processing capability becomes large, the modes are gradually shifted to the higher-accuracy modes and the number of the enemy cars is also gradually increased.

As explained so far, a plurality of processing modes, which are different from each other in processing accuracy, are prepared for one or more enemy cars. For every loop processing, it is determined if the current processing modes used in the CPU 101 are adequate for processing of the enemy cars. If the determination is NO (inadequate), the processing modes are automatically updated depending on the current residual processing capability. The updated processing modes are effective in the enemy car processing in the next loop. Hence, the calculation load does not exceed the maximum processing capability of the CPU 101 and is not so extremely light to the CPU 101 so that the idling operation is avoided. The calculation load are maintained into an adequate range for every loop processing. This dynamic algorithm for mode control permits the CPU to effectively work its capability to accurately and adequately control behavior of the enemy cars.

Without any relation to largeness of the residual processing capability of the CPU, the nearer enemy cars to the player's car are given higher-accuracy processing modes. Thus, players can obtain more real feeling from the entire screen. Accordingly to the conventional process, the CPU processes all the enemy cars at an equal accuracy even when its residual processing capability is small. This equal-accuracy manner results in rough processing due to a limited residual processing capability. Therefore, differentiated-accuracy processing modes of this embodiment are advantageous, in particular, when the CPU 101 has less residual processing capability. The limited residual processing capability can be used preferentially for nearer enemy cars which are given higher-accuracy processing modes.

Further, FIG. 21 exemplifies control of polygons of the background including a running road executed at Step 305 in FIG. 18 (i.e., Steps in FIG. 20). Assume that in FIG. 21 the number of polygons in each prestored area ARn (n=1, 2, ...) is as follows: $AR_1=300$, $AR_2=700$, $AR_3=300$, $AR_4=400$, and $AR_5=500$. When the player's car is positioned at a point A in FIG. 21, the upper limit for displaying polygons is set to 1500. In such a case, by the processing in FIG. 20, $AR_1+AR_2+AR_3=300+700+500=1500$ is found, so that all the 1500 polygons belonging to three areas $AR_1$ to $AR_3$ are specified into the geometerizer 110 because the addition exactly satisfies the upper limit.

When the player's car moves to another point B, suppose that the upper limit is the same as "1500" (the upper limit can be changed at another point B; refer to Step 305-4 in FIG. 20). For this case, 1500 polygons which satisfy $AR_2$+$AR_3$+part of $AR_4$=700+500+300=1500 are specified into the geometerizer 110. In other words, only 300 polygons taken from the beginning among 400 polygons belonging to the area $AR_4$ are counted into the objective display polygons. The geometerizer 110 always can use the polygons thus-specified exactly to the upper limit for performing the perspective conversion for each view $\theta_1$, $\theta_2$, ... which change time-dependently.

As mentioned above, using a plurality of areas of background polygons divided beforehand along the running road, the polygons are only added up in number. Thus, this eliminates the need for the conventional complicated determination shown in FIG. 24. This permits reduced calculation load to the CPU 101 and exclusion of excessive (outside of viewing range) parts of the background from the display. The number of objective display polygons still remains at the changeable upper limit. It is possible to effectively use the limited number of polygons for displaying only required portions of the most possible distant background including the running road.

As understood from the above, the second embodiment also has the same or equivalent advances with respect to the car motion simulation, car collision determination, and others.

In the present invention, the special display effect can be changed or combined with others. For example, sprays of snow can be adopted independently or combinedly with sprays of sand (water). Furthermore, the object being employed in the game system of the invention may be another such as airplanes, ships, or motorcycles.

The embodiments of the invention have been described as above, but it is understood that the invention is not limited to such embodiments and that the invention can be practiced into other various modified embodiments within the scope of the invention.

What we claim is:

1. A game system in which a virtual object is moved in virtual surroundings on a screen of a display, the system comprising:

means for simulating the motion of the object in response to inputted information concerning an expected motion of the object and in consideration of interaction forces between the object and the surroundings, the interaction forces being operated on at least two positions of the object.

2. The system of claim 1, wherein the object is a car realized by performing a program implemented in the system.

3. The system of claim 2, wherein the at least two positions are at wheels of the car.

4. The system of claim 3, further comprising means for virtually suppressing the motion of the car simulated by the simulating means.

5. The system of claim 2, wherein the simulating means includes a means for determining a collision caused on the screen between the car and at least one other car, and wherein the car and the at least one other car have an oval shape.

6. The system of claim 1, wherein the simulating means includes an element that calculates a parameter value representing a special effect with regard to the simulated motion of the object, and the displaying means includes an element that displays the calculated special effect on the screen together with the simulated motion of the object.

7. The system of claim 6, wherein the object is a car realized by performing a program implemented in the system.

8. The system of claim 1, further comprising:
means for providing the inputted information from a player; and
means for displaying simulated results of the object on the screen of the display.

9. The system of claim 1, further comprising:
means for virtually suppressing the motion of the object simulated by the simulating means.

10. A game system in which a virtual object in the form of a car is moved in virtual surroundings on a screen of a display, the system comprising:
means for simulating the motion of the car, realized by performing a program implemented in the system, in response to inputted information concerning an expected motion of the car and in consideration of interaction forces between the car and the surroundings, the interaction forces being operated on at least two wheel positions of the car; and
means for virtually suppressing the motion of the car simulated by the simulating means;
wherein the simulating means comprises first means for calculating forces applied to the wheels; and second means for calculating the motion of the car including a yawing motion on the basis of the forces calculated by the first calculating means.

11. The system of claim 10, wherein the suppressing means has a virtual damper suppressing the yawing motion.

12. The system of claim 11, wherein the second calculating means is a means that calculates at least one of a yawing angular velocity and a slip angle of the car as a parameter concerning the yawing motion.

13. The system of claim 12, wherein the virtual damper is a damper virtually producing an attenuating force suppressing at least one of the yawing angular velocity and the slip angle.

14. The system of claim 10, further comprising:
means for providing the inputted information from a player; and
means for displaying simulated results of the object on the screen of the display.

15. A game system in which a virtual object in the form of a car is moved in virtual surroundings on a screen of a display, the system comprising:
means for simulating the motion of the car, realized by performing a program implemented in the system, in response to inputted information concerning an expected motion of the car and in consideration of interaction forces between the car and the surroundings, the interaction forces being operated on at least two positions of the car,
wherein the simulating means includes an element that calculates a parameter value representing a special effect with regard to the simulated motion of the car, and
wherein the parameter is at least one of a spray of sand, a spray of water, and a spray of snow, each representing an attribute of a virtual running road on which the car runs.

16. A game system in which a virtual object is moved in virtual surroundings on a screen of a display, the system comprising:
means for simulating the motion of the object in response to inputted information concerning an expected motion of the object and in consideration of interaction forces between the object and the surroundings, the interaction forces being operated on at least two positions of the object wherein the simulating means includes an element that calculates a parameter value representing a special effect with regard to the simulated motion of the object.

17. The system of claim 15, further comprising:
means for providing the inputted information from a player; and
means for displaying simulated results of the object on the screen of the display.

18. A game system in which a virtual car is moved in virtual surroundings on a screen of a display, the system comprising:
means for simulating the motion of the car in response to provided information; and
means for virtually suppressing the motion of the car simulated by the simulating means,
wherein the car is realized by performing a program implemented in the system,
the simulating means comprises first means for calculating forces applied to the wheels and second means for calculating the motion of the car including a yawing motion on the basis of the forces calculated by the first calculating means, the second calculating means is a means that calculates at least one of a yawing angular velocity and a slip angle of the car as a parameter concerning the yawing motion, and
the suppressing means has a virtual damper virtually producing an attenuating force suppressing at least one of the yawing angular velocity and the slip angle.

19. The system of claim 18, further comprising:
an input device for providing from a player operating information concerning an expected motion of the car.

20. A game system comprising a processing apparatus executing a given task at every specified interval, thereby displaying movement of at least two objects including a player's object on a monitor as a game, the game system comprising:
means for calculating a current residual processing capability of the processing apparatus in synchronization with the specified intervals; and
means for determining a processing mode for the at least one object other than the player's object on the basis of the calculated residual reprocessing capability, the processing mode being used in a next coming interval of the specified intervals;
wherein the processing apparatus comprises means for executing a data process of the at least one other object for the next interval accordingly to the determined processing mode.

21. The system of claim 20, wherein the residual processing capability calculating means comprises means for presuming an amount of processing load of the processing apparatus for the next interval and means for estimating the residual processing capability based on the presumed amount of processing load.

22. The system of claim 21, wherein the processing mode determining means is a means that determines the processing mode by referring the presumed amount of processing load to a table having correspondence between predetermined estimates of the residual processing capability estimated by the estimating means and the processing modes.

23. The system of claim 21, wherein the specified interval is a display period of one frame in the monitor, the amount of processing load is an occupation time of processing occupied in the display period, and the residual processing capability is a remaining lime produced by deducting the occupation time from the display period.

24. The system of claim 20, wherein the objects are cars and the game is a car race in which the player's car competes with the at least one other car designated as an enemy car.

25. The system of claim 24, wherein the processing mode includes a plurality of processing modes differentiated from each other in accuracy of processing the enemy car, and the processing mode determining means has a means that selects the processing having the accuracy in proportion to the residual processing capability.

26. The system of claim 25, wherein the enemy car consists of a plurality of enemy cars, and the processing mode determining means has a means that assigns the processing mode having the higher accuracy to the enemy car nearer in distance to the player's car.

27. The system of claim 25, wherein the processing mode having the highest accuracy is a mode requiring a behavior estimation of respective suspensions of four wheels of the enemy car and a simulation of the enemy car in accordance with the behavior estimation of the respective suspensions.

28. A game system in which an object displayed on a monitor is moved on the monitor along a traveling path included in a background composed of polygons, the system comprising:

means for prestoring the polygons of the background divided into a plurality of areas along the travelling path;

means for determining that the object resides in which one of the areas;

means for specifying a number of displaying polygons used for display among the polygons of the background every time when the area is determined by the determining means, the number of the displaying polygons being within an upper limit; and means for displaying the background together with the object using the displaying polygons of the at least one area picked up so as to satisfy the number of the displaying polygons.

29. The system of claim 28, wherein the specifying means comprises means for adding in number the polygons of each area from the determined area designated as an origin of addition in sequence in a direction of traveling along the traveling path and means for comparing an added value added by the adding means with the upper limit.

30. The system of claim 28, wherein the upper limit is changeable according to one of the areas in which the object resides.

31. The system of claim 28, wherein the object is a car.

32. A game system in which an object displayed on a monitor is moved on the monitor along a traveling path included in a background composed of polygons, the system comprising:

means for prestoring the polygons of the background divided into a plurality of areas along the traveling path; and means for instructing display of the background using the polygons of the areas associated with movement of the object.

33. A method of processing data handled in a game system in which a processing apparatus executes a given task at every specified interval, thereby displaying movement of at least two objects including a player's object on a monitor as a game, the method comprising the steps of:

calculating a current residual processing capability of the processing apparatus in synchronization with the specified intervals;

means for determining a processing mode for the at least one object other than the player's object on the basis of the calculated residual reprocessing capability, the processing mode being used in a next coming interval of the specified intervals; and means for instructing the processing apparatus to execute a data process of the at least one other object for the next interval accordingly to the determined processing mode.

34. A game system in which a virtual object is moved in a virtual surrounding on a screen of a display, the system comprising:

means for simulating the motion of the object in response to inputted information concerning an expected motion of the object and in consideration of the interaction force between the object and the surroundings, the simulating means including an element that calculates a parameter value responding to a special effect with regard to the simulated motion of the object; and display control means for displaying the calculated special effect on the screen together with the simulated motion of the object.

35. A game system comprising a processing apparatus executing a given task at every specified interval, thereby displaying movement of at least two objects including a player's object on a monitor as a game, the game system comprising:

means for calculating a current residual processing capability of the processing apparatus in synchronization with the specified intervals; and means for determining a processing mode for the at least one object other than the player's object on the basis of the calculated residual reprocessing capability, the processing mode being used in a next coming interval of the specified intervals;

wherein the processing apparatus comprises means for executing a data process of the at least one other object for the next interval according to the determined processing mode, the player's object competes with the at least one other object designated as an enemy object, the processing mode includes a plurality of processing modes differentiated from each other in accuracy of processing the enemy object, and the processing mode determining means has a means that selects the processing having the accuracy in proportion to the residual processing capability, and the enemy object consists of a plurality of enemy objects, and the processing mode determining means has a mean s that assigns the processing mode having the higher accuracy to the enemy object nearer in distance to the player's object.

* * * * *